May 10, 1955
J. SHER ET AL
2,708,044
TRACTOR TRAILER CARRIER
Filed Jan. 9, 1953
2 Sheets-Sheet 1
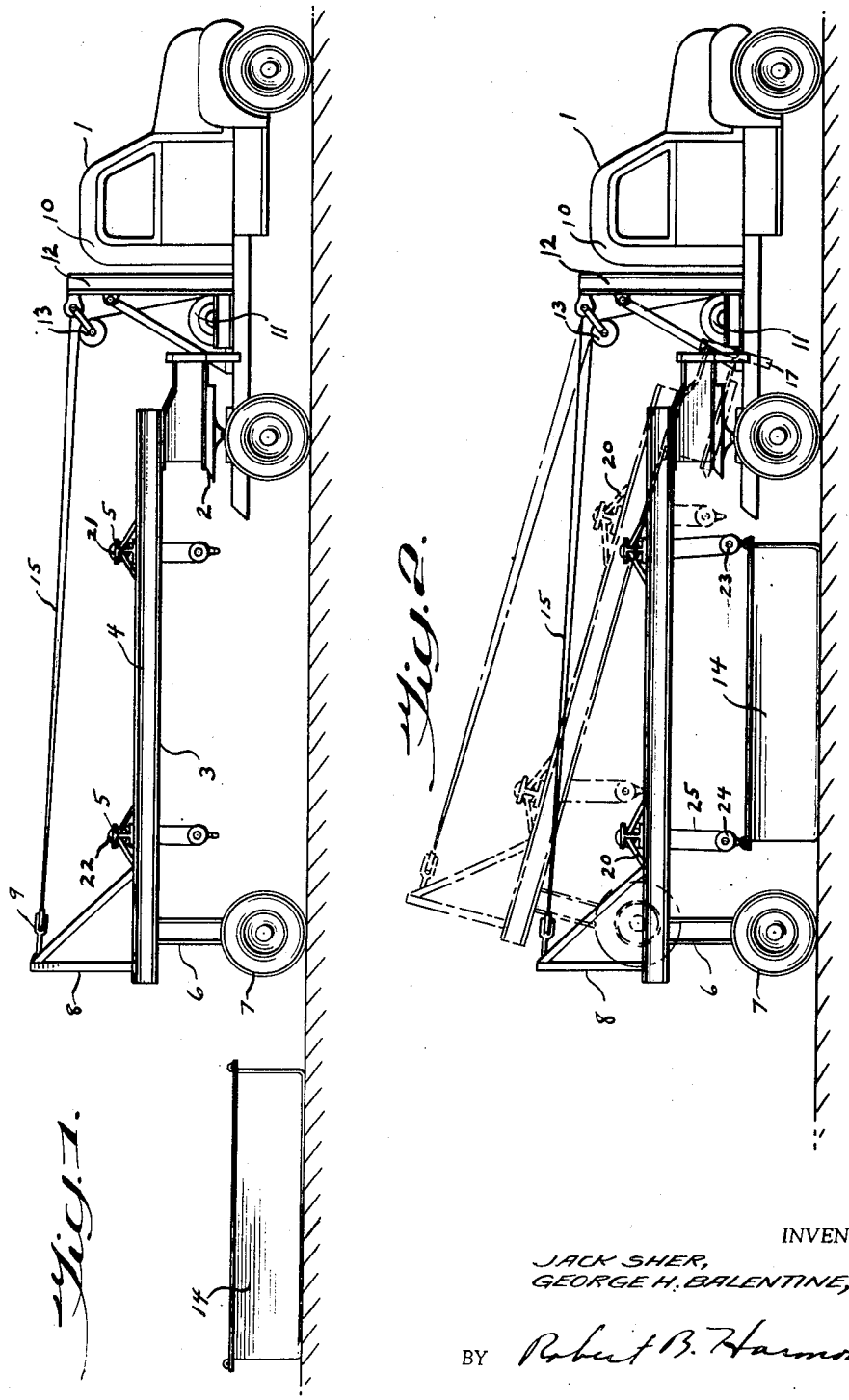
INVENTORS
JACK SHER,
GEORGE H. BALENTINE, JR.
BY Robert B. Harmon
ATTORNEY May 10, 1955
J. SHER ET AL
2,708,044
TRACTOR TRAILER CARRIER
Filed Jan. 9, 1953
2 Sheets-Sheet 2
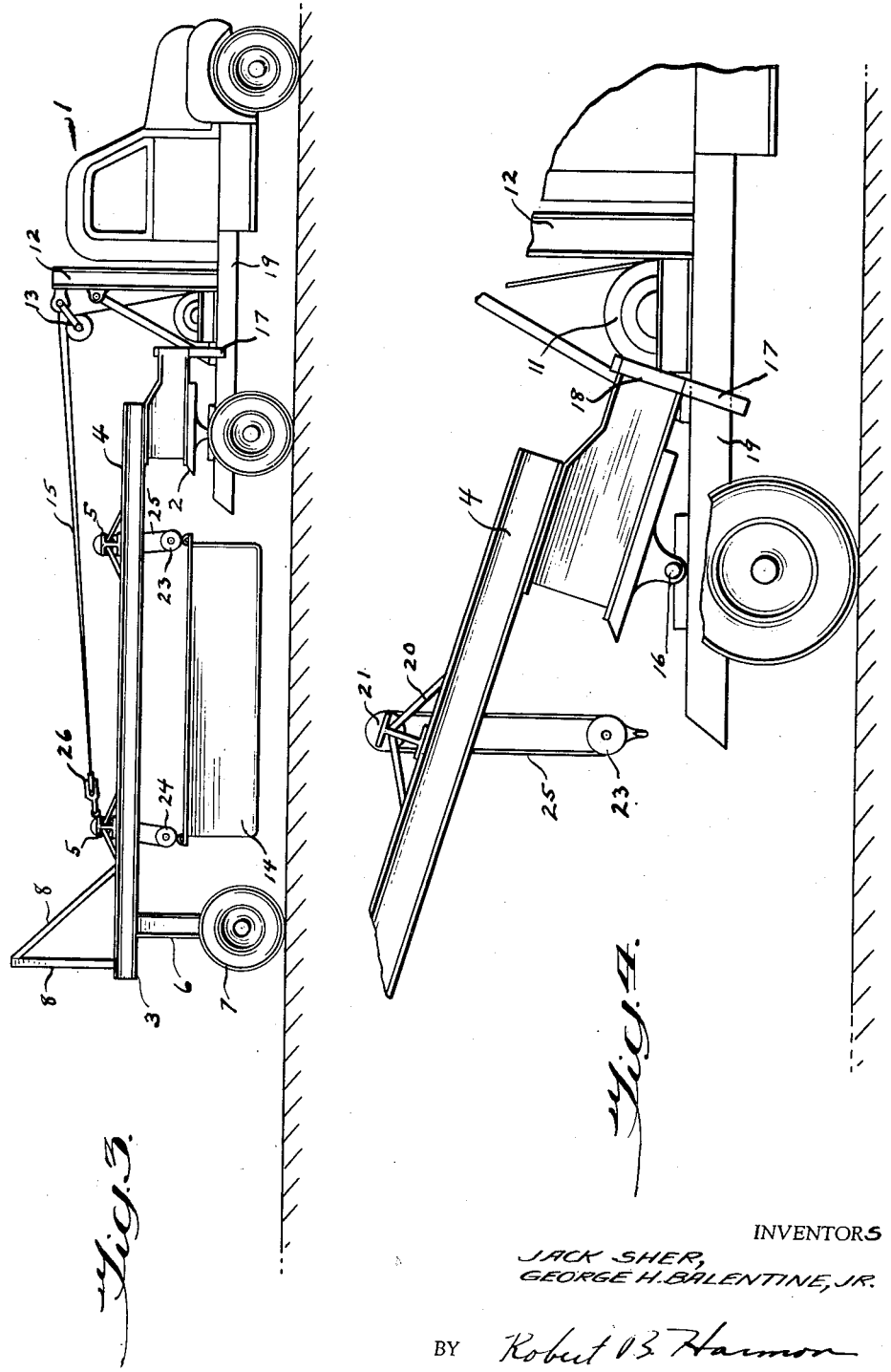
INVENTORS
JACK SHER,
GEORGE H. BALENTINE, JR.
BY Robert O.S. Harmon
ATTORNEY

United States Patent Office 2,708,044
Patented May 10, 1955

2,708,044
TRACTOR TRAILER CARRIER

Jack Sher and George H. Balentine, Jr., Greenville, S. C.

Application January 9, 1953, Serial No. 330,392

6 Claims. (Cl. 214—394)

The present invention relates, in general, to carriers and has more particular reference to tractor-trailer-type vehicles employing a fifth-wheel.

The primary object of the invention is to provide a trailer connected to a tractor in such manner that the trailer may be pivoted in the vertical plane about the fifth-wheel to permit the ready positioning of the trailer over relatively large loads.

A more specific object of the invention is to provide a tractor-trailer-carrier with actuating means on the tractor portion of the carrier for pivoting the trailer portion of the carrier about the fifth-wheel as an axis in order to more readily position the trailer over a load to be carried.

A further object of the invention is to provide a tractor-trailer-carrier wherein a trailer of the type, used to carry the loads underneath the frame thereof, may be pivoted about the fifth-wheel of the tractor so as to more readily position the trailer over the top of relatively large loads.

It frequently becomes desirable to haul rather large boxes, crates, and the like, by means of tractor-trailer-carriers. In the past it has been necessary to either lift such loads into the trailer vehicle, or if an under-the-frame-type carrier is utilized, it has been necessary to manipulate the tractor in awkward movements in order to try and straddle a load. This latter type of difficulty is also pronounced in the limitations on load-size which a trailer can properly handle.

The present invention will permit loads having dimensions up to and including the maximum in width and relatively unlimited in length to be carried without any maneuvering by the tractor driver in order to position the trailer over the load.

With the foregoing and other objects in view, the invention resides in the following specification and appended claims, certain embodiments and details of construction of which are shown in the accompanying drawings, in which—

Figure 1 is a view of the invention in side elevation with the carrier being shown in the position prior to loading the trailer;

Figure 2 is a view in side elevation, similar to Figure 1, but showing the trailer portion of the carrier in dotted lines in a vertically swung position overlying the load;

Figure 3 is a view in side elevation of the invention showing the load in a hoisted or carrying position on the trailer; and Figure 4 is a view of the invention in side elevation showing a portion of the trailer in pivoted position about the fifth-wheel of the tractor with means to keep the trailer from swinging laterally with respect to the tractor.

Referring more particularly to the drawings, the tractor 1 is shown connected by fifth-wheel 2 to a semi-trailer 3. The tractor and its fifth-wheel construction are standard and a detailed description of the construction thereof is not deemed necessary.

The semi-trailer consists of two parallel longitudinal frame members 4 cross-connected by brace members 5. This frame construction may be of any suitable design, but that shown in the drawing appears to be about as simple and practical a design as could be devised.

Extending from the rear portion of the frame 3 are axle-carrying standards 6 for supporting wheels 7. Upstanding from the rear of said frame members 3 are sheave brace members 8 for carrying a sheave 9.

Mounted adjacent to the cab 10 of the tractor 1 is a standard winch 11. Extending upwardly along the back of the cab are brace members 12 for supporting a sheave 13.

The operation of the invention will become obvious from Figure 2 of the drawing. Assuming that it is desired to carry a substantially large box 14, the driver of the tractor backs the rear wheels of the trailer adjacent to box 14. At this point the tractor winch is actuated to drive or wind the cable 15 which is interconnected between the winch and the sheaves 9 and 13 to swing the rear end of the trailer upwardly in a substantially vertical plane about the fifth-wheel horizontal shaft 16 as an axis. To prevent lateral displacement of the trailer during the vertical swinging movement, guide rods 17, which are removably secured by any suitable means to a portion 18 of the trailer frame, engage against tractor side frame elements 19 in guiding relationship therewith.

With the trailer in a position shown in Figure 2, the driver may then back the tractor over the load 14 and subsequently lower the rear end of the trailer until the wheels 7 engage the ground. In this manner, the dimensions of the load 14 are merely limited by the permissible widths of carriers for use on highways and the length of such load is limited only by the practical requirements of trailer lengths. It is thus seen that no maneuvering of the tractor is necessary to enable the driver to position the trailer over the top of relatively large loads.

After the trailer has been positioned over the load, the load may be hoisted to a carrying position by means to be described. Between the parallel trailer frame members 4, at spaced points thereon, and provided with suitable bracing means 20 are hoisting sheaves 21 and 22. A hoisting cable 25, which is secured at one end to the frame 4, is passed under a sheave 23 and over sheave 21 downwardly about sheave 22 and under sheave 24, and then back upwardly about a second position in sheave 24 for connection to the cable 15. In order to hoist the load adjacent to the frame members 4 the cable 15 is secured to the end 26 of cable 25. The driver may then actuate the winch to tension the cable 15 and through cable 25 raise the load adjacent the underside of frame members 4. Any suitable latch means, not shown, is used to attach the load to the frame during transit so that the load will not be carried by the cable means. However, this is not to imply that the cable means is not capable of carrying such loads. At this point, with the load hoisted to carrying position, the driver removes the guide rods 17 from the frame portion 18 in order to permit pivotal action between the tractor and the trailer, between the fifth-wheel 2.

Further, it is readily realized that the winch or other power actuated means may be mounted on the trailer with suitable interconnection to the tractor. This may be desirable when a trucking company is utilizing a fleet of tractors and requires only one trailer of the present type, thereby obviating the necessity of a power actuator on each tractor.

It is readily understood by the inventors that other means of actuation, than the cable and sheave arrangement shown, may be utilized to pivot the trailer about the fifth-wheel, such as a chain-drive, hydraulic mechanism, and the like.

We claim:

1. A carrier including a tractor and a trailer connected to said tractor through a fifth-wheel, load supporting frame members on said trailer, wheel supporting means depending from said frame members, load hoisting means connected to said frame members between said wheel supporting means and the fifth-wheel connection with the tractor, sheave supporting means upstanding from the rear portion of said trailer frame member for supporting a sheave, sheave supporting means connected to the tractor for supporting a sheave thereon, a winch secured to the tractor, and cable means interconnecting said winch and trailer and tractor sheaves for raising the trailer in the vertical plane about the fifth-wheel connection as an axis.

2. A carrier including a tractor and a trailer connected to said tractor through a fifth-wheel, load supporting frame members on said trailer, wheel supporting means depending from said frame members, load hoisting means connected to said frame members between said wheel supporting means and the fifth-wheel connection with the tractor, sheave supporting means upstanding from the rear portion of said trailer frame member for supporting a sheave, sheave supporting means connected to the tractor for supporting a sheave thereon, a winch secured to the tractor, and cable means interconnecting said winch and trailer and tractor sheaves for raising the trailer in the vertical plane about the fifth-wheel connection as an axis, said cable means being adapted for ready connection to said load hoisting means for hoisting loads to a supported position on said trailer.

3. A carrier comprising a tractor, a trailer, a plurality of wheels at the rear of the trailer for supporting that extremity of said trailer, pivot means interconnecting the trailer to the tractor and supporting the forward end of the trailer on the tractor so as to permit movement of the trailer in the vertical and horizontal planes, load hoisting and supporting means carried by said trailer between the wheels and the pivot means, and means interconnecting the tractor and the trailer for swinging said trailer in a substantially vertical plane about the pivot means so that the trailer wheels will clear the top of a load to be hoisted and carried by said load hoisting and carrying means.

4. A carrier comprising a tractor, a trailer, a plurality of wheels at the rear of the trailer for supporting that extremity of said trailer, pivot means interconnecting the trailer to the tractor and supporting the forward end of the trailer on the tractor so as to permit movement of the trailer in the vertical and horizontal planes, load hoisting and supporting means carried by said trailer between the wheels and the pivot means, means interconnecting the tractor and the trailer for swinging said trailer in a substantially vertical plane about the pivot means so that the trailer wheels will clear the top of a load to be hoisted and carried by said load hoisting and carrying means, and means to prevent lateral displacement of the trailer from the substantially vertical plane when the trailer is swung in the vertical plane during the positioning of the trailer over a load to be carried by said trailer.

5. A carrier comprising a tractor, including a frame, a trailer, a plurality of wheels at the rear of the trailer for supporting that extremity of said trailer, pivot means interconnecting the trailer to the tractor and supporting the forward end of the trailer on the tractor so as to permit movement of the trailer in the vertical and horizontal planes, load hoisting and supporting means carried by said trailer between the wheels and the pivot means, means interconnecting the tractor and the trailer for swinging said trailer in a substantially vertical plane about the pivot means so that the trailer wheels will clear the top of a load to be hoisted and carried by said load hoisting and carrying means, and means connected to the trailer adjacent said pivotal connection and coacting with the frame of the tractor to prevent lateral displacement of the trailer from the substantially vertical plane when the trailer is swung in the vertical plane during the positioning of the trailer over a load to be carried by said trailer.

6. A carrier comprising a tractor including a frame, a trailer, a plurality of wheels at the rear of the trailer for supporting that extremity of said trailer, a pivotal connection between the tractor and trailer permitting vertical and lateral swing of the trailer, means interconnecting the tractor and the trailer for swinging the trailer in a substantially vertical plane about said pivotal connection, and guide rod means detachably connected to the trailer adjacent to said pivotal connection and coacting with the frame of the tractor to prevent lateral displacement of the trailer from the substantially vertical plane when the trailer is swung in the vertical plane.

References Cited in the file of this patent

UNITED STATES PATENTS

| | | |
|---|---|---|
| 2,126,819 | Schawlem | Aug. 16, 1938 |
| 2,127,347 | Tinker | Aug. 16, 1938 |
| 2,312,769 | Mosling | Mar. 2, 1943 |
| 2,329,659 | Smith | Sept. 14, 1943 |
| 2,360,654 | Day | Oct. 17, 1944 |
| 2,376,296 | Walter | May 15, 1945 |
| 2,391,857 | Arps et al. | Jan. 1, 1946 |
| 2,481,223 | Johnson | Sept. 6, 1949 |
| 2,483,033 | Baker | Sept. 27, 1949 |
| 2,484,709 | Heath | Oct. 11, 1949 |
| 2,499,013 | Wood | Feb. 28, 1950 |
| 2,546,472 | O'Connor | Mar. 27, 1951 |
| 2,692,147 | Whitney | Oct. 19, 1954 |